No. 633,738. Patented Sept. 26, 1899.
D. J. SHELDRICK.
DRIVE CHAIN.
(Application filed July 27, 1891.)
(No Model.) 2 Sheets—Sheet 1.
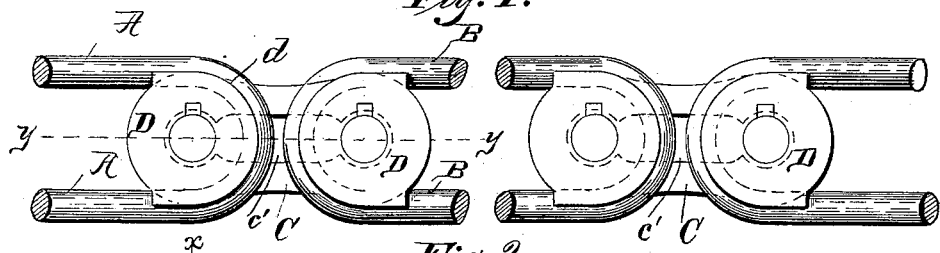
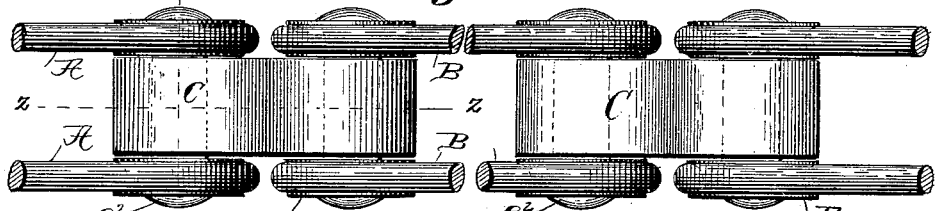
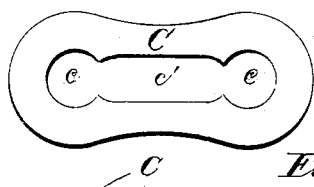
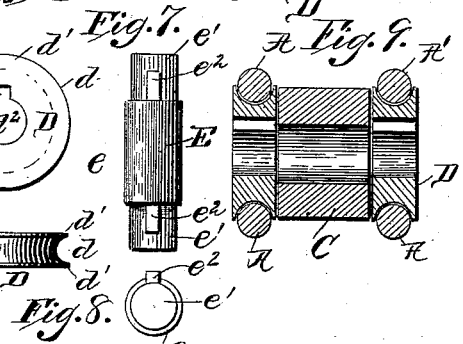
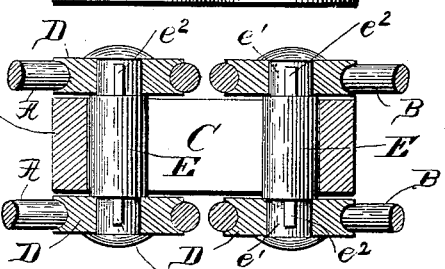
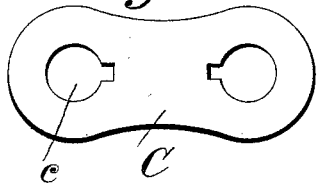
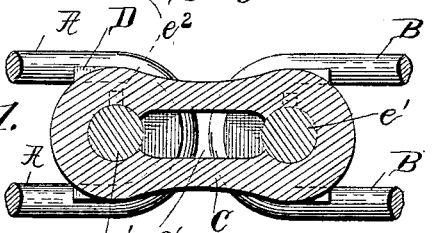
Witnesses
Marcus L. Byng
Marcus B. May
Inventor
David J. Sheldrick
by D. M. Kedzie & Bliss
Attorneys
THE NORRIS PETERS CO., PHOTO-LITHO., WASHINGTON, D. C.

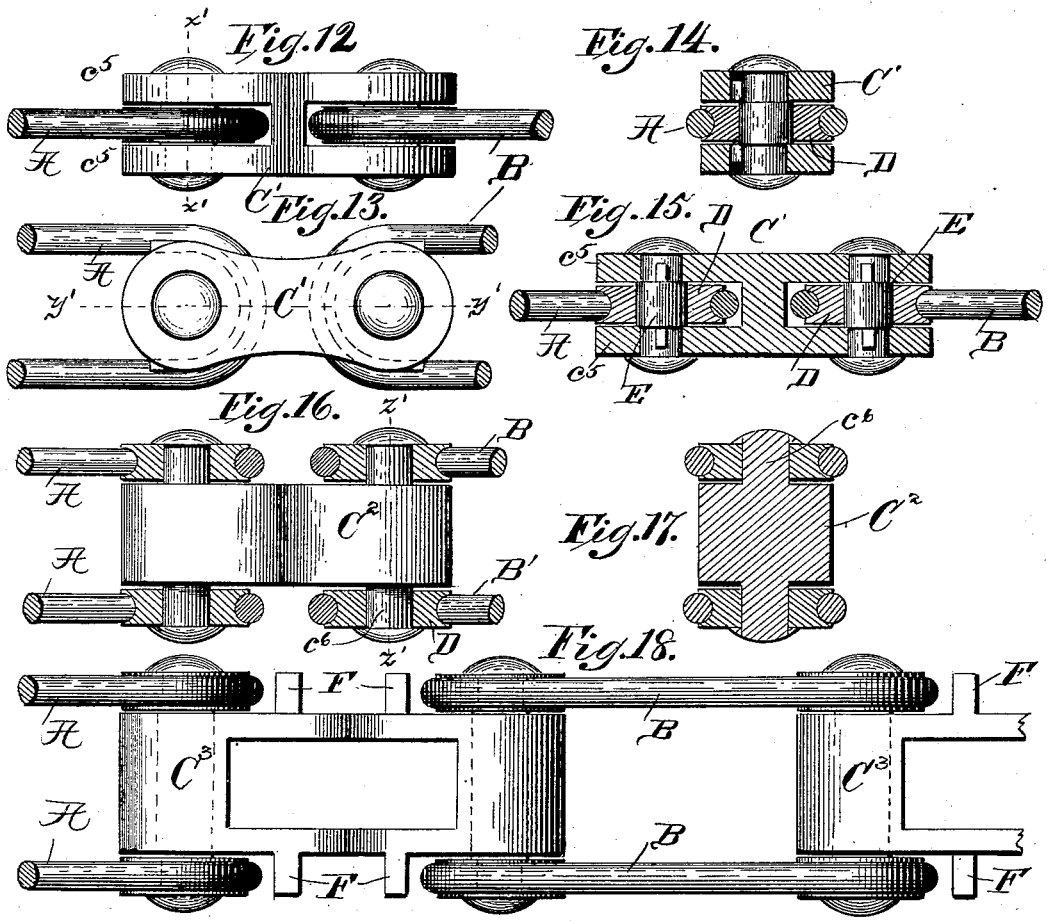

UNITED STATES PATENT OFFICE.

DAVID J. SHELDRICK, OF COLUMBUS, OHIO.

DRIVE-CHAIN.

SPECIFICATION forming part of Letters Patent No. 633,738, dated September 26, 1899.

Application filed July 27, 1891. Serial No. 400,853. (No model.)

*To all whom it may concern:*

Be it known that I, DAVID J. SHELDRICK, a citizen of the United States, residing at Columbus, in the county of Franklin and State of Ohio, have invented certain new and useful Improvements in Drive-Chains, of which the following is a specification, reference being had therein to the accompanying drawings.

This invention relates to chains of the sort in which use is made of wrought bar-links of the common sort—that is, links formed of wrought-iron rods round in cross-section and having their ends welded together, they being bent into a shape more or less approximating an ellipse. It is well known that links of this sort possess great strength, considering the cross-section of the metal, and many methods have been devised for utilizing them in the manufacture of chains in such way that the curved end part of one link shall not engage with and wear upon that of the adjacent link. A number of the said ways that have been attempted or proposed depend upon the interposition of metallic blocks with curvilinear grooves, one for receiving the end of one link and another for receiving the next. In some such cases the two adjoining links have been so connected as to lie in planes at right angles to each other, which is objectionable, from the fact that the sprocket-wheels cannot without special provision engage readily with the links, nor, again, can all of the links be utilized successively for engaging with similar sprockets. In another sort of these chains use has been made of two lines of the wrought rod-links arranged in pairs, the four adjacent ends of each contiguous pair being connected by means of a casting having four laterally-projecting pintles or necks with heads at the ends. A construction of this sort overcomes some of the objections incident to those of the first above described, as the chain as a whole can be so constructed as to be practically "flat" and have a greater number of points of engagement with the teeth of an ordinary sprocket-wheel; but to it there are incident serious disadvantages, among them being this, that all of the wear experienced is taken by the curved end parts of the wrought bar or rod links, and these are the more expensive part of the chain.

The chain which I have devised has the parts so arranged that it is practically flat throughout—that is, all of the wrought links are in parallel planes—and at the same time all or the greater part of the wear can be taken off from the curved end parts of these links and be taken by articulating-pintles, which are more or less similar to those now in use in chains of other sorts, and which pintles when worn can be readily removed and new ones can be substituted without materially increasing the expense of the chain.

Figure 1 is a side view of a portion of a chain sufficient to illustrate my invention. Fig. 2 is a plan view thereof. Figs. 3 and 4 are respectively a side and a top view of one of the malleable couplers. Figs. 5 and 6 are respectively a face view and an edge view of one of the link blocks or saddles. Figs. 7 and 8 are respectively a side view and an end view of one of the pintles. Figs. 9 and 10 are sections taken respectively on the lines $x\ x$ and $y\ y$, Figs. 2 and 1. Fig. 11 is a section on line $z\ z$ of Fig. 2. Fig. $11^a$ shows a slightly-modified form of coupler. Figs. 12, 13, 14, and 15 are respectively a plan view, a side view, a transverse section, and a vertical longitudinal section of a modification. Figs. 16 and 17 show another modification, in which a separate pintle is not used. Fig. 18 shows a coupler with a central opening and adapted to engage with a tooth on a wheel.

In the drawings, A A represent the parts of a pair of wrought rod-links arranged parallel to each other and adapted to form the side parts or bars of one main link of the chain, and B B represent an adjacent pair.

C represents a coupler or connecting-link having tubular bearings for receiving the pintles used to connect said coupler-link C with the links A A and B B. This coupler is preferably made of malleable iron, but can be constructed of other forms of metal if desired. The links or side parts of the chain do not engage directly with this coupler or with projections formed thereon. Blocks or saddles, each indicated generally by D, are interposed between the links and the coupler C, said parts D being also preferably made of malleable iron. Each is formed with an aperture $d^2$, corresponding to the apertures $c$ in the coupler C in position, though preferably of somewhat less diameter, and has a circumferential groove $d$, with flanges $d'$ $d'$, of a curvature corresponding to the ends of the wrought links. The aperture $d^2$ has a recess $d^3$ communicating with it, the two together forming a keyhole-like perforation.

E represents one of the pintles. It is so constructed and arranged as to give a large wearing-surface at the points of articulation. Preferably it has a central cylindrical part $e$, of relatively large diameter, which is adapted to be seated within the tubular bearing in the coupler-link C, hereinbefore referred to, and two end parts $e'$ $e'$, of a smaller diameter, together with lugs, spurs, or projections $e^2$. The part $e$ is of a length equal to the width of the coupler C. The parts $e'$ can fit snugly in apertures $d^2$ in the saddle-blocks D, the lugs $e^2$ being adapted to lie in the recesses $d^3$ in said saddles or blocks D. The pintles may be secured in place in any suitable way. They may be riveted at one of their ends or the lugs $e^2$ may be of such length as that when the links are in ordinary working position the inner ends of said lugs will bear against the side faces of the coupler C, one or both ends $e'$ of the pintles being headless and adapted to be locked in place by suitable devices, so that the pintles can be readily inserted into or drawn out from its place when its link is turned into an inclined position to the coupler—that is to say, the chain may be so constructed as to have its links either detachable at any time or permanently held to each other. The coupler C has an opening $c'$, extending from one of the pintle-seats $c$ to the other, and this may be utilized as a passage-way for the ends of the spurs or lugs $e^2$ when the pintle is being inserted or withdrawn, the link held by said pintle being at an angle at such time, as aforesaid.

From the foregoing description and the drawings it will be seen that the saddles D are locked against rotation on the pintles, and when the links are in operative or working position each saddle is locked against displacement relative to its supporting-link by the flanges $d'$ on the saddle; and in order to disengage said saddles from the links they must be turned into such position as to bring the coupler C and link into an inoperative or non-working relation—that is, the saddle must be turned into such a position that its plain ungrooved peripheral portion will be adjacent to one of the side bars of the link. When the parts are in this position, the saddle can be disengaged from the link, the flanges $d'$ engaging with but one of the side bars instead of with both side bars and the end portion thereof, as they do when the parts are in operative position, as shown in Fig. 1; but it is not necessary that a large aperture like that at $e'$ should be present, as the coupler may be solid at the center if small grooves be formed at the sides of apertures $c$, as in Fig. 11$^\text{a}$. In respect to this part of the invention—to wit, the employment of a coupler more or less similar to that at C, with recessed pintle-seats for permitting the introduction or withdrawal of pintles which automatically lock themselves laterally—all of the details which I have used for illustration are not necessary, as a chain having wrought bar-iron or steel side parts corresponding to those at A B, detachable at any time from each other when out of working position, can be constructed on the plan herein provided.

The method of building up a chain with the parts shown in Figs. 1, 2, 3, &c., will be readily understood. The side parts A A, for instance, first have the blocks or saddles D D inserted therein, respectively, said blocks or saddles lying in such position that their recesses $d^3$ are in the planes of aperture $c'$ in coupler C or at right angles to the position shown in Fig. 1. Then a pintle is inserted, first, through a saddle D, then through the coupler, and then through the opposite saddle, the lugs $e^2$ being in the plane of recesses $d^3$ and $c'$, so that one of them can pass from side to side. Afterward the saddles are turned around, bringing the curved ends of the links into the grooves $d$ and throwing the lugs $e^2$ out of line with groove $c'$, they lying permanently in the recesses $d^3$. Preferably the blocks or saddles D and the grooves $d$ therein are so shaped that when the parts are in operative position portions of the rectilineal parts of the links or bars A A, &c., shall lie in the groove which will lock said parts A A in the saddles against rotation thereon. Therefore all the motion of articulation is taken by the pintle and the wear upon the other parts is reduced; but with proper modifications of the other parts the bars or links A A, &c., may be loosely mounted in the saddles or blocks without regard to whether there is rotation or not. In such case the pintles should have, supplemental to the parts $e^2$, locks, such as heads, keys, nuts, or equivalents. A chain of this character can be made very cheaply and will have much greater strength than one made throughout of castings.

I have hereinbefore referred to the part indicated by C as being a "coupler;" but it will be seen that it is virtually an inner link in the chain, having tubular end bars to receive the pintles by which it is connected with adjacent outer links, and can be so regarded irrespective of whether it engages with the wheel-sprockets or not. That it can be so constructed as to engage with a sprocket is illustrated in Fig. 18, where it is shown in a chain such as illustrated in Fig. 1, and is provided with centrally-open space or aperture to receive a tooth. To prevent the escape of the side parts A, &c., lugs, as at F, can be formed on the coupling-link $C^3$ at points suitably near to the side parts of the adjacent links. Hence I wish the claims herein to be construed with the understanding that the said part C is a coupler-link intermediate of those at A A and B B, whether of exactly the form shown or one modified as to details. As a coupler-link it plays an important part in conjunction with the pintles in a chain largely composed of the above-described wrought rod-links, for by means of it I can provide a perfect articulation for such links and at the same time arrange the latter in substantially one and the same plane throughout. In Figs. 12, 13, 14, and 15 all of the wrought rod-links are in a single line, this illustrating the fact that some of the characteristic parts of the invention can be retained without having a double line of the wrought links, as in Figs. 1, 2, &c. In these figures the coupler-link C' is recessed at the ends, and in the recesses can lie saddles or wearing-blocks D, there being ears or flanges $c^5$ at the sides, with pintle-seats which communicate with ways adapted to receive the projections on the pintle. The parts can be connected together detachably or permanently, as described. As shown, the ends of the pintle are formed into heads. Again, the peculiar functions of the coupler-link and the saddles can be maintained if the pintles are of modified character. In Figs. 16 and 17 the coupler $C^2$ has laterally-extending pintle-like projections $c^6$, adapted to receive the saddles for the wrought rod-links, and on these pintles the saddles can be held against detachment in any suitable way, as, for instance, by lugs on the outer ends of the former, adapted to pass through the slots $d^3$.

While I have above described more in detail the particular advantages from this construction and arrangement of parts in the manufacture of wrought rod-link chains, yet I wish to note that some of these can be utilized in the making of chains having more or less flat side bars. This is particularly true of large and expensive chains, in which it is desirable to reduce the expense from wear on the more expensive parts. Thus the improvements described herein can be advantageously employed in the manufacture of steel chains—that is, chains having the side parts formed of flat steel bars.

I am aware that a chain has been heretofore made having a coupler and links articulated with said coupler by a pintle and such as illustrated in the patent to E. L. Howe, No. 304,325, dated September 2, 1884, and also that links lying in transverse longitudinal planes have had wearing-blocks inserted between them, as in the patent to W. D. Ewart, No. 347,148, dated November 29, 1887, and I do not claim these specific constructions as of my invention.

Chains are well known of various forms in which the side bars or elements corresponding to those at A A' and D D' instead of having separated bars of metal at the top and bottom are continuous strap-like bars with pintle-seats at the ends and connected to intermediate coupler-links, and so far as concerns those features of my invention not directly incident to the openness, vertically, of the side bars or side members illustrated I do not confine myself to the latter. It is also well known that pintles for connecting together two links or a link and a coupler can have a central wearing part or bushing of larger diameter than the end parts, either integral with the end parts or formed separately and connected to the pintle part proper, as shown, for instance in the Patent No. 378,139 to B. A. Legg and others; but I believe myself to be the first to have formed a chain with alternating centrally-open links and couplers of the kind herein presented, the couplers being continuous flat-surfaced links extending continuously across the open spaces of the centrally-open links in combination with a pintle locked in the ends of the side bars or members of the centrally-open links, so as to be incapable of rotation therein and having in the seat in the coupler an enlargement to provide a wearing-surface and rotating in the coupler.

What I claim is—

1. In a chain, the combination of a link, a coupler, a second link, a pintle passing transversely through the coupler and the first link, a second pintle passing transversely through the coupler and the second link, a saddle-block detachably engaging with the first link and locked to the first aforesaid pintle, and a saddle-block loosely engaging with the second link and locked to the second aforesaid pintle, substantially as set forth.

2. In a chain, the combination of a link, a coupler, a second link, a pintle passing transversely through the coupler and the first link, a second pintle passing transversely through the coupler and the second link, and two saddle-blocks respectively interposed between the coupler and the said links and surrounding the said pintles, each pintle being locked against rotation relatively to one of the parts joined thereby.

3. In a chain, the combination of a link-like coupler having a transverse aperture, a pintle seated in said aperture, a centrally-open link at one end of the coupler having two side bars or members, a saddle-block interposed between each of said side bars or members and the pintle and locked against rotation thereon and one or more links connected to the other end of the coupler, substantially as set forth.

4. In a chain, the combination of a coupler, a pintle seated in a bearing in said coupler, a link, and a saddle or wearing block carried by said link and engaging with the pintle, said block and link being detachable only when the link is in a non-working position, substantially as set forth.

5. In a chain, the combination of a coupling bar or link, pintles seated in bearings in said coupler, one pintle adjacent to each end of said coupler, saddle-blocks secured against rotation on said pintles, and connecting links or bars, each adapted to support one of said saddle-blocks, substantially as set forth.

6. In a chain, the combination with two links having side parts at A, of an intermediate link or coupler having two pintle-bearings formed therein, two pintles supported in said bearings and adapted to rock therein, and two pairs of wearing-blocks, those of each pair being locked to one of the said pintles, against rotation thereon, and loosely connected to one of the first said links, substantially as set forth.

7. In a chain, the combination of a series of wrought bar or rod links, A, B, lying in the same longitudinal lines, saddle-blocks secured to the adjacent ends of said links, and a coupler connecting the saddle-blocks, whereby the links can vibrate in parallel planes, substantially as set forth.

8. In a chain, the combination with the coupler and two pintles seated therein, of the wrought rod-links, A, B, lying in parallel planes, and the saddles secured thereto, and mounted independently on said two coupler-pintles, substantially as set forth.

9. In a chain, the combination with the coupler, of the wrought rod-links, the saddles secured to said links, and the two independent pintles connecting said saddles to said coupler, substantially as set forth.

10. In a chain, the combination of the coupler, the wrought rod-links, A, B, the saddles secured to said links, and the pintles mounted in the said coupler and locked against rotation relatively to the said saddles, substantially as set forth.

11. In a chain, the combination with the rod-link, of a saddle adapted to fit within the end of the link and having flanges adapted to engage with the side bars of the link and hold the saddle from movement laterally thereof, a pintle locked to the saddle against rotation, a coupler having an aperture for said pintle whereby it is connected to the aforesaid link, and supplemental links connected to the coupler, substantially as set forth.

12. In a chain, a series of centrally-open links each having two similar side bars or members straight from end to end, and a series of centrally-closed coupler-links, each coupler-link being interposed between two of the centrally-open links and extending continuously from the side bars or members on one side of the centrally-open links to the side bars or members on the other side, a pintle passing through the coupler and having a wearing-enlargement in the coupler, and having its ends locked to the side bars or members of one of the centrally-open links to prevent rotation in relation thereto, and a similar pintle connecting the coupler to the other adjacent centrally-open link, substantially as set forth.

In testimony whereof I affix my signature in presence of two witnesses.

DAVID J. SHELDRICK.

Witnesses:
S. R. MOUNTAIN,
C. W. WELLER.